(12) United States Patent
Lee et al.

(10) Patent No.: US 6,345,029 B1
(45) Date of Patent: Feb. 5, 2002

(54) OPTICAL PICKUP APPARATUS AND METHOD

(75) Inventors: Chul-Woo Lee; Jang-Hoon Yoo, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/144,648

(22) Filed: Aug. 31, 1998

(30) Foreign Application Priority Data

Aug. 30, 1997 (KR) ............................................ 97-44707

(51) Int. Cl.$^7$ ................................................ G11B 7/00
(52) U.S. Cl. ................ 369/118; 369/44.24; 369/112.01
(58) Field of Search ............................... 369/112, 44.23, 369/44.37, 94, 118, 110, 112.01, 112.22, 112.23, 112.24, 112.25, 112.26, 44.24, 53.2, 53.22, 53.26

(56) References Cited

U.S. PATENT DOCUMENTS

| | | | |
|---|---|---|---|
| 5,665,957 A | * 9/1997 | Lee et al. | 369/118 |
| 5,696,750 A | * 12/1997 | Katayama | 369/112 |
| 5,790,506 A | 8/1998 | Morita et al. | 369/94 |
| 5,793,734 A | * 8/1998 | Tsuchiya et al. | 369/94 |
| 5,844,879 A | * 12/1998 | Morita et al. | 369/112.26 |
| 5,912,868 A | * 6/1999 | Hayashi et al. | 369/94 |
| 5,982,732 A | * 11/1999 | Yamanaka | 369/44.37 |

FOREIGN PATENT DOCUMENTS

| | | |
|---|---|---|
| EP | 0747893 A2 | 12/1996 |
| EP | 0803867 A2 | 10/1997 |
| EP | 0855701 A2 | 7/1998 |
| GB | 2312548 A | 10/1997 |
| JP | 8-55363 A | 2/1996 |
| JP | 9-212899 | 8/1997 |
| JP | 10-208267 | 8/1998 |
| JP | 10-255306 | 9/1998 |
| JP | 10-312579 | 11/1998 |
| JP | 10-320815 | 12/1998 |

\* cited by examiner

*Primary Examiner*—Thang V. Tran
(74) *Attorney, Agent, or Firm*—Staas & Halsey LLP

(57) ABSTRACT

An optical pickup apparatus and method which can selectively perform optical pickup with respect to at least two types of optical disks, on which information recording surfaces are formed, having a different thickness. The optical pickup apparatus includes an optical path alteration unit for altering a path of a light beam so that the light beam emitted from each light source proceeds toward the disk, a numerical aperture adjustment unit, including an annular shielding region which is disposed concentrically about an optical path axis between the optical path alteration unit and the disk supporter, for providing different numerical apertures according to a characteristic of a light beam to be incident; and an objective lens for respectively focusing the light beams having passed through the numerical aperture adjustment unit on the information recording surfaces of the disks to form a beam spot. Accordingly, the apparatus provides a relatively simple structure thereby reducing fabricating cost.

20 Claims, 1 Drawing Sheet

OPTICAL PICKUP APPARATUS AND METHOD

CROSS-REFERENCE TO RELATED APPLICATIONS

This application claims the benefit of Korean Application No.97-44707, filed Aug. 30, 1997, in the Korean Industrial Property Office, the disclosure of which is incorporated herein by reference.

BACKGROUND OF THE INVENTION

The present invention relates to an optical pickup apparatus and method for optical pickup, and more particularly, to an optical pickup apparatus and method therefor which can perform optical pickup on disks having different thicknesses.

Recently, disk type recording media have become popular for recording and reproducing information containing video, audio, data, etc. The most popular disk types are a standard recording-density recordable compact disk (CD-R) and a high recording-density digital versatile disk (DVD). Characteristics of CD-Rs and DVDs are shown in table 1.

TABLE 1

|  | Thickness (mm) | Track pitch ($\mu$,m) | Wavelength (nm) | NA |
| --- | --- | --- | --- | --- |
| CD-R | 1.2 | 1.6 | 780 | 0.4~0.45 |
| DVD | 0.6 | 0.74 | 635 | 0.6 |

As can be seen from table 1, CD-Rs and DVDs have different thicknesses and different information recording surfaces on which different track pitches are formed. Therefor to perform optical pickup on both CD-Rs and DVDs, light beams having different specific wavelengths must be used. For example, if optical pickup is performed on a DVD using an apparatus for optical pickup on a CD-R, spherical aberrations are generated due to the difference in thickness between the DVD and the CD-R. Accordingly, separate apparatus and methods are currently used for optical pickup of a CD-R and a DVD.

Various optical pickup apparatuses compatible with both CD-Rs and DVDs have recently been proposed. These proposed optical pickup apparatuses: (1) use a separate objective lens for disks having different thickness, (2) use an expensive holographic optical element, and (3) use a liquid crystal diode (LCD) shutter. Several applications relating to an optical pickup apparatus and/or an optical pickup method compatible with CD-Rs and DVDs have been filed by the same applicant, including: U.S. Pat. No. 5,743,304 and U.S. patent application Ser. No. 09/031,541.

However, these proposed optical pickup apparatuses compatible with a conventional CD-Rs and DVDs use relatively high-priced components such as holographic optical elements and LCD shutters, increasing production cost. Further, when employing an objective lens, the proposed optical pickup apparatus should form a "finite optical system," requiring a relatively complicated structure to focus light beams on a disk.

SUMMARY OF THE INVENTION

In order to solve the above noted problems, an object of the present invention is to provide an optical pickup apparatus and method compatible with disks having a different thickness.

It is another object of the present invention to provide an optical pickup apparatus and method having a reduced production cost utilizing a relatively simple construction process.

Additional objects and advantages of the invention will be set forth in part in the description which follows, and, in part, will be obvious from the description, or may be learned by practice of the invention.

To accomplish the above objects of the present invention, there is provided an optical pickup apparatus having a disk supporter for selectively loading at least two types of optical disks, each having a different thickness on which information recording surfaces are formed, a plurality of light sources, respectively maintaining different spaced distances from the disk supporter, for emitting light beams of respectively different wavelengths for optical pickup of the disks loaded on the disk supporter, and a plurality of photodetection units.

Each photodetection unit includes an optical path alteration unit for altering a path of a light beam so that the light beam emitted from each light source proceeds toward the disk; a numerical aperture adjustment unit, including an annular shielding region which is disposed concentrically about an optical path axis between the optical path alteration unit and the disk supporter, for providing a different numerical aperture according to a characteristic of a light beam to be incident; and an objective lens for respectively focusing the light beams passed through the numerical aperture adjustment unit, onto the information recording surfaces of the disks, forming a beam spot.

The plurality of light sources include a first light source and a second light source. It is preferable that the shielding region maintains a predetermined reference numerical aperture with respect to the light beam in a horizontal direction from any one side of the first light source and the second light source, and maintains a predetermined numerical aperture or below with respect to the light beam in the form of a divergent beam from other side thereof.

The first light source emits a light beam having a wavelength of 790 nm~800 nm, and the second light source emits a light beam having a wavelength of 600 nm~800 nm. In order to effectively perform optical pickup, the shielding region has an inner diameter of 1.2 mm and an outer diameter of 1.45 mm centering the optical axis.

To achieve another object of the present invention, there is provided an optical pickup method for selectively performing optical pickup with respect to at least two types of optical disks having a different thickness on which information recording surfaces are formed, the optical pickup method including: forming an optical path of light beams having different wavelengths capable of performing optical pickup with respect to the respective disks; providing an annular shielding region disposed concentrically about an optical axis of the optical path, providing different numerical apertures according to a characteristic of a light beam to be incident; loading a disk to be picked-up on the disk supporter; and emitting light beams capable of performing optical pickup with respect to the loaded disk, forming a beam spot on the information recording surface of the disk via the numerical aperture adjustment unit, and detecting the light beam containing information obtained from the disk.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
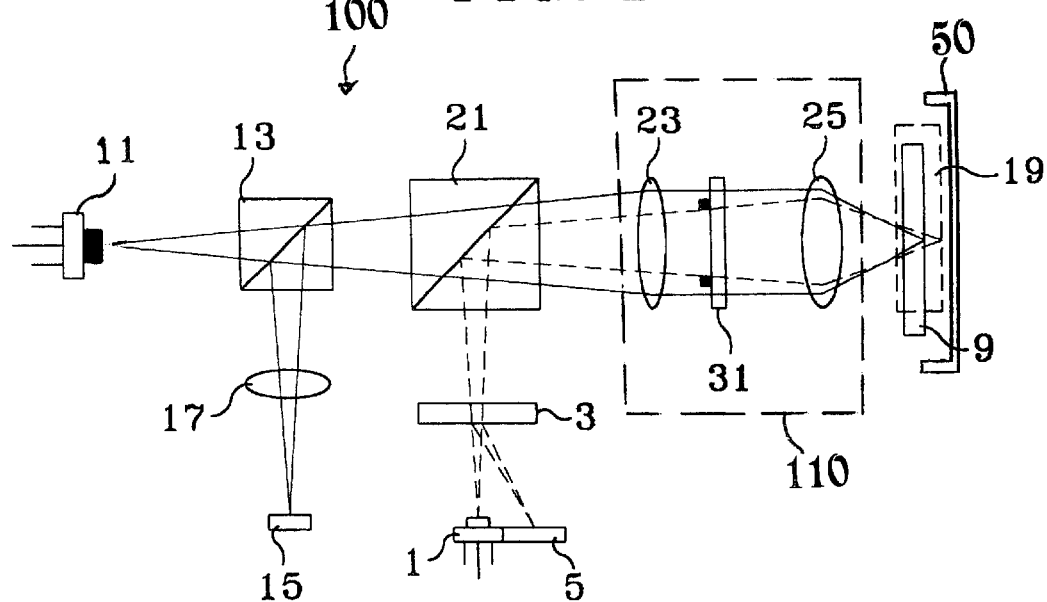
FIG. 1 is a block diagram of an optical pickup apparatus according to a preferred embodiment of the present invention.

Reference will now be made in detail to the present preferred embodiment of the present invention, an example of which is illustrated in the accompanying drawings, wherein like reference numerals refer to like elements throughout.

FIG. 1 is a block diagram of an optical pickup apparatus 100 according to a preferred embodiment of the present invention. The optical pickup apparatus 100 generally includes a disk supporter 50 for selectively supporting a CD-R 19 and a DVD 9, a first light source 1 for emitting a first light beam, a second light source 11 for emitting a second light beam, a photodetector 5 associated with the first light source 1, and a photodetector 15 associated with the second light source 11. Preferably, the first light source 1 and the first photodetector 5 are integrally incorporated into a single unit.

The second light source 11 emits a light beam having a wavelength of 635 nm and is opposedly spaced apart at a predetermined interval from the disk supporter 50. The first light source 1 emits a light beam having a wavelength of 780 nm and is disposed perpendicularly to an axis of an optical path between the second light source 11 and the disk supporter 50. Both the first and second light sources 1 and 11 are preferably constructed with laser diodes. Further, each of the light sources 1 and 11 are placed at a different distance from the disk supporter 50.

An optical path alteration unit 21 is provided where the light from the first light source 1 and the light from the second light source 11 intersect. The optical path alteration unit 21 transmits the beam emitted from the second light source 11 toward the disk supporter 50 and reflects the beam emitted for the first light source 1 toward the disk supporter 50. The optical path alteration unit 21 preferably comprises a beam splitter which reflects the light beam (having a 780 nm wavelength) emitted from the first light source 1 toward the disk supporter 50 and transmits the light beam (having a 635 nm wavelength) emitted from the second light source 11. The optical path alteration unit 21 is referred to as the beam splitter 21 hereinafter.

A finite optical system 110 is provided on the optical path axis between the beam splitter 21 and the disk supporter 50. The finite optical system focuses the light beam from the beam splitter 21 onto the surfaces of the disks 9 or 19 (whichever may be in place).

Figure 2:
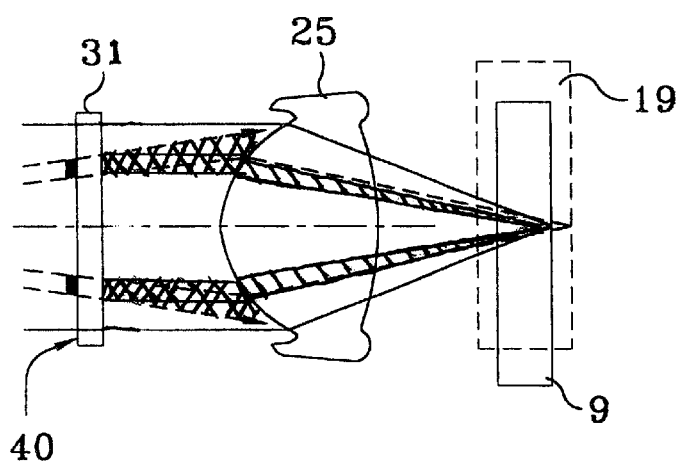
FIG. 2 is a diagram of a portion of the finite optical system shown in FIG. 1.

FIG. 2 is a diagram of a portion of the finite optical system 110 shown in FIG. 1. The finite optical system 110 generally includes a collimating lens 23 (shown in FIG. 1), an annular aperture 31 disposed behind the collimating lens 23, and an objective lens 25 disposed on an opposite side of the annular aperture 31 from the collimating lens 23. The collimating lens 23 collimates the second light beam emitted from the second light source 11 into parallel light and transmits the collimated light, in an orthogonal direction to a plate surface of the DVD 9, as shown in FIG. 1. Conversely, the first light beam from the first light source 1 is transmitted in the form of a divergent beam and then directed to the annular aperture 31.

Figure 3:
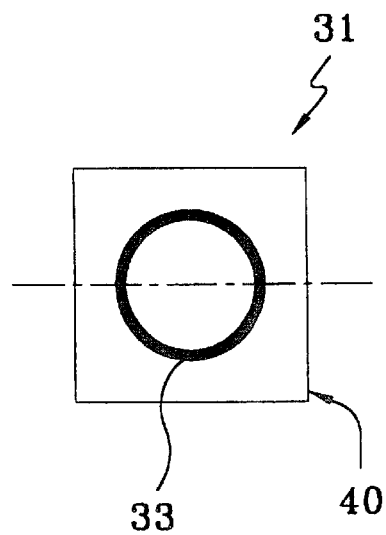
FIG. 3 is a front view of an annular aperture shown in FIG. 1 and FIG. 2.

FIG. 3 is a front view of an annular aperture 31 shown in FIG. 1 and FIG. 2. The annular aperture 31 generally comprises a plate surface 40 having an annular shielding region 33. The plate surface 40 of the annular aperture 31 is almost rectangular in shape. The shielding region 33, formed concentrically about the optical path axis of the light beam, has a numerical aperture (NA) which can be varied according to the wavelength of a light beam and an angle of incidence. One of ordinary skill in the art will recognize that the shielding region 33 is constructed based on the structure of the disks 9 and 19 along with the characteristics of the first and second light sources 1 and 11. A similar shielding region is shown in the above-referenced U.S. patent application Ser. No. 09/031,541. In accordance with the preferred embodiment the shielding region 33 is designed having an inner diameter of 1.2 mm and an outer diameter of 1.45 mm appropriate for effectively obtaining optical pick-up with respect to a CD-R 19 and a DVD 9. The objective lens 25 focuses a light beam transmitted via the annular aperture 31 on the information recording surfaces of the disks 9 and 19, forming a beam spot.

Referring once again to FIG. 1, a first holographic beam splitter 3 is positioned between the optical path alteration unit 21 and the first light sources 1 on the axis of the optical path. A second holographic beam splitter 13 is positioned between the optical path alteration unit 21 and the second light sources 11 on the optical path axis. The holographic beam splitters 3 and 13 transmit the light beams emitted from the light sources 1 and 11, respectively, and bend the light beams reflected from the disks 19 and 9 toward the first and second photodetectors 5 and 15, respectively The light bent toward the second photodetector 15 is preferably focused by a lens (or lens system) 17.

In operation, the optical pickup apparatus 100, in accordance with a preferred embodiment of the present invention, has a controller or user interface, which makes the first or second light source 1 or 11 emit a light beam based on the type of disk loaded on the disk supporter 50.

When a DVD 9 is loaded on the disk supporter 50, the second light source 11 emits a light beam for optical pickup of the DVD 9. An optical path of the light beam emitted from the second light source 11 is shown by solid lines in FIG. 1. Generally, the light beam transmitted via the beam splitter 21 passes through the collimating lens 23, is converted into a parallel light beam, and then is incident on the annular aperture 31 in a direction orthogonal to the plate surface of the DVD 9. At this time, the light beam is shielded by the shielding region 33 of the annular aperture 31, and a reference numerical aperture of 0.6 is created. The light beam (having a 635 nm wavelength) transmitted through the annular aperture 31 is formed, by the objective lens 25, as a beam spot on the information recording surface of the DVD 9.

Next, a reflected light beam, containing the information recorded on the recording density surface of the DVD 9, proceeds back along the path to the second holographic beam splitter 13 and is bent toward the second photodetector 5.

When a CD-R 19 is loaded on the disk supporter 50, the first light source 1 emits the light beam (having a 780 nm wavelength). The light beam is reflected toward the disk supporter 50 by the beam splitter 21, as shown by dotted lines in FIG. 1. The reflected light beam is transmitted via the collimating lens 23 in the form of a divergent beam to the annular aperture 31. The shielding region 33 shields the light beam whose numerical aperture is greater than or equal to 0.45. The light beam, having a radius ranging from 1.2 mm to 1.45 mm, is shielded by a characteristic of the shielding region 33, and at the same time the light beam passing through an external side of the shielding region 33 (shown in an arrow of FIG. 2) is deviated from the radius of the objective lens 25. As a result, the annular aperture 31 limits the transmission of the light beam. Accordingly, the light beam (having a 780 nm wavelength) is transmitted by the objective lens 25 to form a beam spot, having a radius of about 1.4 μm, thereby allowing the optical pickup of the CD-R.

On the other hand, the reflected light beam, containing information from the CD-R 19, is bent by the beam splitter 21 toward the first holographic beam splitter 3. The reflected light beam is bent by the first holographic beam splitter 3 onto the first photodetector 5.

As described above, the optical pickup apparatus and method of the present invention provide a relatively simple structure including an annular aperture in which an annular shielding region is formed compatible with both CD-R and DVD to reduce fabricating cost.

Although the first embodiment of the present invention has been described with respect to a specific configuration, it will be recognized that the first embodiment is not limited to the specific configuration. For example, the shielding can be obviously accomplished by means of optical reflection, absorption, deflection and scattering. Further, while the optical recording media was described as a CD-R and a DVD, the present invention can provide an optical pickup structure which is compatible with various disks having a different thickness.

Although one preferred embodiment of the present invention has been shown and described, it will be appreciated by those skilled in the art that changes may be made in this embodiment without departing from the principles and spirit of the invention, the scope of which is defined in the claims and their equivalents.

What is claimed is:

1. An optical pickup apparatus for use with a first optical disk and a second optical disk, the first optical disk having a different thickness than the second optical disk, the optical pickup apparatus comprising:
   a disk supporter for selectively loading the first optical disk and the second optical disk;
   a first light source that can emit a first light beam having a wavelength related to the first optical disk;
   a second light source that can emit a second light beam having a wavelength related to the second optical disk;
   an optical path alteration unit that receives the first and second light beams and directs the first and second light beams toward said disk supporter;
   an annular aperture including an annular shielding region disposed concentrically about an axis of an optical path between said optical path alteration unit and said disk supporter, the annular shielding region adjusting a numerical aperture to provide a different numerical aperture based on the wavelength of the first and second light beams and blocking the first and second light beams incident on the annular shielding region; and
   an objective lens focusing light beams, passed through said annular aperture, forming a beam spot on the disk supported by said disk supporter.

2. The optical pickup apparatus according to claim 1, wherein the annular shielding region maintains a predetermined reference numerical aperture with respect to the light beam to be incident in a horizontal direction from any one side of the first light source and the second light source, and maintains a predetermined numerical aperture or below with respect to a light beam to be incident in the form of a divergent beam from the other side thereof.

3. The optical pickup apparatus according to claim 2, wherein the first light beam has a longer wavelength than the second light beam; and
   further comprising:
      a collimating lens, located between the optical path alteration unit and the annular aperture, transmitting the second light beam in the horizontal direction, and transmitting the first light beam in the form of a divergent beam.

4. An optical pickup apparatus for use with a first optical disk and a second optical disk, the first optical disk having a different thickness than the second optical disk, the optical pickup apparatus comprising:
   a disk supporter for selectively loading the first optical disk and the second optical disk;
   a first light source that can emit a first light beam having a wavelength related to the first optical disk;
   a second light source that can emit a second light beam having a wavelength related to the second optical disk;
   an optical path alteration unit that receives the first and second light beams and directs the first and second light beams toward said disk supporter;
   an annular aperture including an annular shielding region disposed concentrically about an axis of an optical path between said optical path alteration unit and said disk supporter, said annular aperture adjusting a numerical aperture to provide a different numerical aperture based on the first and second light beams;
   a collimating lens, located between said optical path alteration unit and said annular aperture, transmitting the second light beam in the horizontal direction, and transmitting the first light beam in the form of a divergent beam; and
   an objective lens focusing light beams, passed through the numerical aperture adjustment unit, forming a beam spot on the disk supported by said disk supporter:
      wherein the annular shielding region maintains a predetermined reference numerical aperture with respect to the light beam to be incident in a horizontal direction from any one side of the first light source and the second light source, and maintains a predetermined numerical aperture or below with respect to a light beam to be incident in the form of a divergent beam from the other side thereof,
      wherein the first light beam has a longer wavelength than the second light beam,
      wherein the first light beam has a wavelength from 700 nm to 800 nm, and the second light beam has a wavelength from 600 nm to 650 nm; and
      the annular shielding region has an inner diameter of 1.2 mm and an outer diameter of 1.45 mm centered around the axis of the optical path.

5. The optical pickup apparatus according to claim 4, wherein said second light source is disposed on a side of said optical path alteration means opposite to said disk supporter and is centered around the axis of the optical path; and
   said first light source is disposed orthogonally to the axis of the optical path.

6. The optical pickup apparatus according to claim 5, wherein said optical path alteration unit transmits the second light beam and reflects the first light beam.

7. The optical pickup apparatus according to claim 6, further comprising:

a first photodetector;

a second photodetector;

a first beam splitter, located between the first light source and the optical path alteration means, transmitting the first light beam, emitted from said first light source toward the disk supported by said disk support, and bending the first light beam, after the first light beam has reflected off the disk supported by said disk support, toward said first photodetector; and a second beam splitter, positioned between the second light source and the optical path alteration unit, transmitting the second light beam emitted from the second light source toward the disk supported by said disk support, and reflecting the second light beam, after the second light beam has reflected off the disk supported by said disk support, toward a second photodetector.

8. An optical pickup method for selectively performing optical pickup from at least two types of optical disks having a different thickness, the optical pickup method comprising the steps of:

loading an optical disk to be read on a disk supporter;

emitting a plurality of light beams, each having a wavelength capable of performing optical pickup on the optical disk to be read;

passing the light beams around but not through an annular shielding region, disposed concentrically about an axis of the optical path taken by the light beam, so as to provide different numerical apertures according to the wavelengths of the light beams;

forming a beam spot on an information recording surface of the optical disk to be read; and detecting a reflected light beam containing information obtained from the disk.

9. An optical disk reader for reading a plurality of types of optical disks, the optical disk reader comprising:

a plurality of light sources, each light source for outputting a beam having a wavelength optimized for one of the types of optical disks;

an optical transmission system receiving the beams from each of the plurality of light sources and directing the beams toward an optical disk being read; and a finite optical system further comprising an annular shielding region blocking portions of incident beams, positioned between said optical transmission system and the optical disk being read, to vary a numerical aperture based on the wavelengths of the light beams.

10. An optical disk reader, according to claim 9, further comprising:

a plurality of photodetectors, each photodetector related to at least one light source and receiving the beam from the light source after the beam has been reflected by the optical disk being read.

11. An optical disk reader, according to claim 10, wherein said optical transmission system receives beams reflected by the optical disk and directs the received beams to an associated photodetector.

12. An optical disk reader, according to claim 11, wherein said optical transmission system comprises:

a beam splitter receiving the beams from each light source and directing the reflected beams back to the appropriate light source; and a plurality of holographic beam splitters, each holographic beam splitter being associated with one of said plurality of photodetectors and receiving the associated beam from said beam splitter and directing the beam to the associated photodetector.

13. An optical disk reader, according to claim 9, wherein said optical transmission system comprises a beam splitter.

14. An optical disk reader, according to claim 9, wherein said plurality of light sources comprises a first light source outputting a beam for a CD-R and a second light source outputting a beam for a DVD.

15. An optical disk reader, according to claim 9, wherein said finite optical system comprises:

a collimating lens receiving the beam from said optical transmission system;

an annular aperture receiving the beam from said collimating lens; and an objective lens receiving the beam from said annular aperture.

16. An optical disk reader, according to claim 15, wherein said annular aperture comprises:

a rectangular plate surface provided with the annular shielding region formed concentrically about an axis of the optical path of the beam.

17. The optical pickup apparatus according to claim 1, wherein the annular aperture further comprises an inner region and an outer region, wherein the outer region receives a horizontal light beam incident in a horizontal direction, and the inner region receives a divergent light beam incident in a divergent direction.

18. The optical disk reader according to claim 9, wherein the finite optical system further comprises an inner region and an outer region, wherein the outer region receives a horizontal light beam incident in a horizontal direction, and the inner region receives a divergent light beam incident in a divergent direction.

19. The optical pickup method of according to claim 8, wherein the passing of the light beam further comprises receiving a divergent light beam and a horizontal light beam.

20. The optical pickup method according to claim 19, wherein the receiving of the divergent light beam and the horizontal light beam further comprises receiving the divergent light beam incident in a divergent direction on an inner region, and receiving the horizontal light beam incident in a horizontal direction on an outer region, wherein the inner region and the outer region are adjacent to the annular shielding region.

* * * * *

UNITED STATES PATENT AND TRADEMARK OFFICE
CERTIFICATE OF CORRECTION

| | | |
|---|---|---|
| PATENT NO. | : 6,345,029 B1 | Page 1 of 1 |
| DATED | : February 5, 2002 | |
| INVENTOR(S) | : Chul-Woo Lee et al. | |

It is certified that error appears in the above-identified patent and that said Letters Patent is hereby corrected as shown below:

<u>Column 7,</u>
Line 25, after "emitting" insert -- one of --; after "beams" insert -- from a plurality of light sources corresponding to the optical disk to be read --; change "each" to -- the one light beam --;
Line 28, after "the" insert -- one --; change "beams" to -- beam --.

Signed and Sealed this

Twenty-second Day of April, 2003

JAMES E. ROGAN
*Director of the United States Patent and Trademark Office*